(12) United States Patent
Dahlén et al.

(10) Patent No.: US 6,410,070 B2
(45) Date of Patent: *Jun. 25, 2002

(54) METHOD FOR REDUCING THE DEGRADABILITY OF ANIMAL FEED PROTEIN

(75) Inventors: Josef Dahlén, Karlshamn; Lars Lindh, Hässelholm; Claes Münter, Västra Frölunda, all of (SE)

(73) Assignee: GEA Evaporation Technologies AB, Göteborg (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/222,872

(22) Filed: Dec. 30, 1998

Related U.S. Application Data

(63) Continuation of application No. PCT/SE97/01198, filed on Jul. 2, 1997.

(30) Foreign Application Priority Data

Jul. 5, 1996 (SE) ................................................ 9602661

(51) Int. Cl.⁷ ........................... A23B 7/005; A23B 9/02; A23L 1/20
(52) U.S. Cl. ....................................... 426/511; 426/521
(58) Field of Search ................................. 426/521, 511

(56) References Cited

U.S. PATENT DOCUMENTS

| | | | | |
|---|---|---|---|---|
| 3,023,107 A | * | 2/1962 | Mustakas et al. | 99/98 |
| 3,911,147 A | * | 10/1975 | Barham et al. | 426/318 |
| 3,970,764 A | * | 7/1976 | Karnofsky | 426/430 |
| 4,022,919 A | | 5/1977 | Comer | 426/511 |
| 4,971,820 A | * | 11/1990 | Likuski et al. | 426/281 |
| 5,064,665 A | * | 11/1991 | Klopfenstein et al. | 426/2 |
| 5,225,230 A | | 7/1993 | Seaman et al. | |
| 5,496,572 A | * | 3/1996 | Rudden | 426/74 |
| 5,662,901 A | * | 9/1997 | Tobey, Jr. et al. | 424/94.2 |
| 5,707,672 A | * | 1/1998 | Taguchi et al. | 426/399 |

FOREIGN PATENT DOCUMENTS

| | | |
|---|---|---|
| DE | 2007588 A1 | 9/1971 |
| DE | 2804659 A1 | 8/1979 |
| SE | 357658 B | 9/1978 |

OTHER PUBLICATIONS

Seab, Exergy Dryer Drying Cattle Fee, www.seab.stork-group.com/ie4/4d.html.*
Merriam Webster Collegiate Dictionary, 9th edition, p. 1153, 1986.*

* cited by examiner

Primary Examiner—Arthur L. Corbin
(74) Attorney, Agent, or Firm—Burns, Doane, Swecker & Mathis LLP

(57) ABSTRACT

A method for reducing the degradability of protein included in vegetable feed for ruminants by steam treatment of the feed wherein the feed is momentarily subjected to a high temperature at a controlled water content by condensation of water vapor on the feed.

16 Claims, No Drawings ial Application No.
METHOD FOR REDUCING THE DEGRADABILITY OF ANIMAL FEED PROTEIN This is a continuation of International Application No. PCT/SE97/01198, filed Jul. 2, 1997, that designates the United States of America and which claims priority from Swedish Application No. 9602661-2, filed Jul. 5, 1996.

The present invention relates to a method for reducing the degradability of protein included in vegetable animal feed for ruminants by heat treatment of the feed.

The quality of vegetable feed for breeding domestic animals is determined by different factors, such as nutritive value, digestibility and palatability. Especially for ruminants, it is known that feeds of different origin contain protein that is too easily degraded in the rumen and, consequently, contributes but to a limited extent to the animal's production of meat and milk.

To maintain the existing tissue in the animal body and to build up new tissue, amino acids must be present. Ruminants obtain these amino acids from two different sources, on the one hand from protein produced by microorganisms in the rumen and, on the other hand, from feed protein that has passed the rumen and is degraded in the intestine. The protein value of a feed for ruminants may therefore be described from two quite separate starting points. One description is based on the amount of released nitrogen which is available in the rumen and which can be used by the microorganisms for building up protein. The other description states the amount of amino acids that can be resorbed in the small intestine, in which case the amino acids derive from microbial protein and from feed protein that is not degradable in the rumen.

For low-producing ruminants, the protein formed by the microorganisms in the rumen can be sufficient. Young animals and high-producing milk cows as well as wool-producing sheep, however, also require access to feed protein that has escaped degradation in the rumen, so-called protected protein.

Different techniques of reducing the degradability of the protein in the rumen, i.e. preparing a protected protein, have been suggested.

Commercial methods for preparing a so-called protected protein are usually based on the addition of chemicals, such as formalin, lignone sulfonates or zinc or magnesium salts, optionally in combination with heat treatment. These known methods all suffer from drawbacks in the form of costs for the addition of chemicals and an increase of the inorganic portion in the feed, expressed as "ballast of ash content". Besides, there is a ban on using formaldehyde in most countries for reasons of environment and health.

It is also known to reduce, by heat treatment, the degradability of animal feed protein (see e.g. Marshall D. Stern, Feedstuffs, Nov. 9, 1981, pp. 24–29). Most of the treatments described have been carried out at temperatures between 120 and 150° C., which are achieved by mechanical friction in, for instance, extruding machines resulting in inhomogeneous treatment. The temperature can also be achieved by treatment in autoclaves, which also results in inhomogeneous treatment. The periods of treatment are long, from about 15 min. to several hours.

Thus, a fairly strong heat treatment is required to achieve a sufficiently high degree of protection. At the same time, the heat treatment is not allowed to be too strong, since the protein may then be "overprotected", and the total degradability decreases.

It has now surprisingly been found that it is possible to accomplish a full protection of feed protein, without side effects, by a very short treatment.

According to the invention, there is thus provided a method for reducing the degradability of protein included in vegetable animal feed for ruminants by heat treatment of the feed, in which method the feed is momentarily subjected to a high temperature at a controlled water content by condensation of water vapor on the feed.

In a preferred embodiment of the invention, the temperature is momentarily raised to 130–170° C., most advantageously to 150–170° C. This temperature is then maintained in the feed for a period of 5 s. to 2 min., preferably 5–15 s., and most advantageously 5–10 s.

The water content of the feed is controlled by condensation of water vapor to at least 15%, preferably 15–25%.

The increase of the temperature of the feed is suitably accomplished by contacting the feed in a momentary and turbulent manner with water vapor having approximately saturation temperature at a pressure of 200–600 kPa.

After the heat treatment, additional heat may be added to the water vapor for superheating thereof, whereby the product is dried to the desired final dry content.

The carrying out of the method according to the invention requires a device for achieving the momentary temperature increase of the vegetable feed.

A suitable device may consist of a closed, pressurised conveying coil, in which superheated water vapor is circulated by means of a centrifugal blower. The conveying loop is suitably fitted with gas-tight supplying and discharging devices, heat exchangers for the controlling of temperature and water content, and a cyclone for separating solid matter. During treatment, severe turbulence is produced, which results in homogeneous treatment.

The water vapor suitably has a pressure of 200–600 kPa and a temperature close to the saturation temperature. When the vegetable feed is fed into the device, vapor will condense homogeneously on the feed. The conditions are suitably controlled to yield a moisture content of at least 15%, preferably 15–25%.

The feed and vapor mixture is then dispersed in a greater flow of superheated water vapor for thermal homogeneous treatment while being pneumatically conveyed for a short time.

As mentioned above, the conveying vapor can be superheated by continued supply of heat for drying the product to the desired final dry content before discharge thereof. After separation of the product, for instance in a cyclone, the vapor can be recirculated by means of the centrifugal blower to the supplying of the feed, optionally after reheating if necessary.

In the momentary temperature increase in the supplying of the feed, the ratio of feed/vapor flow suitably is 1–3 kg/kg, whereas during the thermal homogeneous treatment this ratio suitably is 0.3–0.9 kg/kg.

The method according to the invention can be used for a number of commercially important vegetable feed raw materials, such as rape meal, soybean meal and sunflower seed meal.

The nature of the method is purely physical, and therefore the method does not suffer from any of the drawbacks that appear in chemical or mechanical treatment.

By the inventive method, also other advantages are achieved, such as practically complete enzyme deactivation, disinfection of the feed and removal of solvent residues, if any, that may be left in feed which has been subjected to extraction for the extraction of oil.

The color of the processed feed is unchanged, and the total intestine digestibility of the proteins is unchanged, while the degradability in the rumen for e.g. rape meal is reduced from about 70% to about 40%. In some cases, also a more pleasant taste and smell are obtained compared with the starting product.

Further advantages are achieved by the inventive method, viz.:

- continuous operation of diluted product at high turbulence (Reynolds number $10^6$–$10^7$)
- thermal treatment only
- low operational expenses owing to a small consumption of electric energy and heat energy
- small space requirements.

The invention will now be described in more detail with the aid of the following Example.

EXAMPLE

Heat-treated rape meal was experimentally produced in the following manner. About 36 t/h of rape seeds were compressed and extracted with a solvent in a commercial extraction plant. After recovery of the solvent, about 21 t/h of rape meal were obtained. The fat content of the meal amounted to 2.5% and the water content to 16%. The continuously produced standard-type rape meal was dried to a water content of 11% and cooled before being stored in a meal silo. A representative meal sample was taken and analysed.

In the further continuous production of standard-type rape meal, the meal was subjected to a method according to the invention after recovery of the solvent but before drying and cooling. A representative sample of the thus heat-treated rape meal was taken and analysed.

| Experimental conditions in the method according to the invention | |
|---|---|
| Rape meal flow to the plant according to the invention | 21 t/h |
| Inlet temperature of rape meal | 95° C. |
| Water content | 16% |
| Pressure | 3.2 bar |
| Inlet temperature | 136° C. |
| Residence time | 16 s. |
| Outlet temperature | 145° C. |
| Outlet temperature | 11% |
| Vapour flow (condensation) | 10 t/h (2.1 kg/kg) |
| Vapour flow (treatment) | 30 t/h (0.7 kg/kg) |

| Product data | Heat-treated standard-type meal | Untreated standard-type meal | Note |
|---|---|---|---|
| Raw protein, % of dry substance | 38.2 | 38.2 | |
| Buffer solubility, % of raw protein | 8.7 | 24.6 | (1) |
| Pepsin solubility, % of raw protein | 86.9 | 87.5 | |
| ADF nitrogen, % of nitrogen | 7.1 | 6.8 | (2) |
| Lysine, % of nitrogen | 5.5 | 5.6 | |
| Estimated AAT, g/kg dry substance | 178 | 112 | (3) |
| Results of tests "in sacco" | | | |
| EPD[8], % degradability | 46 | 72 | (4) |
| Digestibility in small intestine, % of nitrogen | 82 | 82 | |

Notes
(1) Solubility in a buffer resembling the rumen fluid of the cow.
(2) ADF nitrogen = Acid detergent fibre nitrogen.
(3) AAT = Amino acids absorbed in the small intestine. See also the comments.
(4) EPD[8] = Effective Protein Degradability. The number states the outlet speed out of the rumen.

Comments

The Table shows that the treatment, as desired, had an insignificant effect on pepsin-soluble raw protein, ADF nitrogen and lysine. The buffer solubility test shows that the solubility of the protein in the synthetic rumen fluid was reduced from 24.6% to 8.7%. Tests in "sacco" in live cows (with net nylon pouches containing rape meal) showed that the degradability was reduced from 72% to 46%, without reduction of the digestibility in the small intestine. According to the "Nordic protein evaluation system for ruminants", the AAT-PBV system, the digestibility in the small intestine was increased by about 60% (Madsen, J. 1985; Acta Agric. Scand. Suppl. 25, 9–20).

Foddering experiments
Comparative experiments with foddering of cows were carried out with standard-type rape meal that was heat-treated according to the invention, and untreated standard-type rape meal. The results are shown in the Table below.

| | Heat-treated standard-type rape meal | Untreated standard-type rape meal |
|---|---|---|
| Milk yield, kg/cow and day | 27.1 | 24.9 |
| Protein, kg/cow and day | 0.86 | 0.81 |
| Fat in milk, % | 4.51 | 4.73 |

What is claimed is:

1. A method for reducing the degradability of a protein contained in a vegetable animal feed for ruminants by a method which consists essentially of subjecting a vegetable animal feed to a heat treatment step by turbulently exposing at a Reynolds number of $10^6$–$10^7$, said animal feed to steam having a saturation temperature ranging from 130 to 170° C. at a pressure ranging from 200 to 600 kPa for a time period ranging from 5 seconds to 2 minutes.

2. The method as claimed in claim 1, wherein the temperature of the animal feed is momentarily raised to 130–170° C.

3. The method as claimed in claim 2, wherein after the momentary increase, the temperature is maintained at 130–170° C. for 5 s. to 2 min.

4. The method as claimed is claim 2, which is carried out continuously.

5. The method as claimed in claim 2, which is carried out on diluted animal feed.

6. The method as claimed in claim 2, wherein the water content of the animal feed is controlled to be at least 15%.

7. The method as claimed in claim 2, wherein the vegetable animal feed consists of rape meal, soybean meal or sunflower seed meal.

8. The method as claimed in claim 1, wherein the temperature is momentarily raised to 150–170° C. and maintained for 5–15 s.

9. The method as claimed in claim 8, which is carried out continuously.

10. The method as claimed in claim 8, which is carried out on diluted animal feed.

11. The method as claimed in claim 8, wherein the water content of the animal feed is controlled to be at least 15%.

12. The method as claimed in claim 1, wherein the animal feed is contacted, in a momentary and turbulent manner, with water vapor at a temperature of 150–170° C. and a pressure of 400–600 kPa, said temperature and pressure being maintained for 5–10 s.

13. The method as claimed in claim 1, which is carried out continuously.

14. The method as claimed in claim 1, which is carried out on diluted animal feed.

15. The method as claimed in claim 1, wherein the water content of the animal feed is controlled to be at least 15%.

16. The method as claimed in claim 1, wherein the vegetable animal feed consists of rape meal, soybean meal or sunflower seed meal.

* * * * *